United States Patent [19]

Arakawa

[11] 4,070,194
[45] Jan. 24, 1978

[54] INK FOR MARKING

[75] Inventor: Kenji Arakawa, Suita, Japan

[73] Assignee: Kinki Aerosol Industrial Co., Ltd., Osaka, Japan

[21] Appl. No.: 658,016

[22] Filed: Feb. 13, 1976

[51] Int. Cl.² ........................... C09D 3/40; D06H 1/02
[52] U.S. Cl. ......................................... 106/30; 106/21
[58] Field of Search .............................. 106/21, 30, 20

[56] References Cited

U.S. PATENT DOCUMENTS

| 1,553,556 | 9/1925 | Rogers | 106/21 |
| 2,678,278 | 3/1954 | Schmutzler | 106/30 |

FOREIGN PATENT DOCUMENTS

| 713,025 | 10/1931 | France | 106/21 |

*Primary Examiner*—Allan Lieberman
*Attorney, Agent, or Firm*—Browdy and Neimark

[57] ABSTRACT

An ink for marking any fabric, which fades to disappear after use, employs a phthalein color. The fading time which is suitable for the marking ink can be regulated by the addition of ethanolamines and lower alcohols so that the phthalein color disappears naturally after from several hours to about 10 days.

When a suitable ink for marking is used to mark a fabric, sewing may be followed according to the mark, and the mark disappears after a lapse of a determined time after the sewing operation is ended.

The ink does not cause damage to the fabric.

5 Claims, No Drawings

INK FOR MARKING

DETAILED DESCRIPTION OF THE INVENTION

The present invention relates to an ink which can be marked on any fabric and which fades to disappear after from several hours to about 10 days.

In sewing operations, fabrics have been cut along marks on the fabrics made with a solid chalk according to pattern papers, or along pattern papers attached to the fabrics with adhesives or staplers. Marking with the solid chalk is not an ideal marking method, because it is inefficient as well as unhealthy, the mark remaining and fine powder flying on removing the mark.

An object of this invention is to provide an ink for marking which is adapted to mark the fabric with a marking pen, and fades to disappear after a determined time on allowing to stand in air.

The ink of this invention employs a phthalein indicator as color, in solution containing about from one to eight % by weight of alkali salts having water of crystallization of at least seven molecules, about 0.5 to 10% by weight of one or more of the following ethanolamines, and about from 10 to 50% by weight of lower alcohols having from one to four carbon atoms.

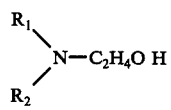

where $R_1 = R_2 =$ C $H_3$ to $C_4H_9$,

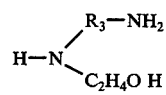

where $R_3 =$ C $H_3$ to $C_4H_9$, and

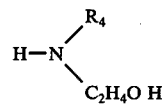

where $R_4 =$ C $H_3$ to $C_2H_5$.

In the ink of such formulation, the phthalein color is colored by alkalinity of the solution. The coloring fades naturally on allowing to stand in air for a long time, which fading is accelerated in the presence of ethanolamines and lower alcohols.

The fading time which is suitable for the ink for marking can be regulated by the addition of ethanolamines and lower alcohols so that phthalein color disappears naturally after from several hours to about 10 days.

If the suitable ink for marking according to this invention is used to mark the fabric, sewing is operated according to the mark, and the mark disappears on a lapse of a determined time after the sewing operation is ended. The ink is healthy and useful, because it does not cause damage to the fabric at all and there is no flying dust like solid chalk.

The ink must be stored in an air-tight vessel, because it fades to decrease the effect on contact with air. A pen which is designed such that a suitable amount of the ink flows out only on marking, for example, a pen such as an aerosol which causes the ink stored under a high pressure to gush out when the tip of the pen is pressed lightly on the fabric, is recommended.

EXAMPLE 1

An ink for marking is manufactured according to the following procedure:

| | |
|---|---|
| 2 % by weight | Sodium carbonate decahydrate |
| 1 % by weight | Borax decahydrate |
| 42 % by weight | Ethyl alcohol |
| 45 % by weight | Water |
| 3 % by weight | o - Cresolphthalein |
| 2 % by weight | Hicoat - R* |
| 5 % by weight | Ethanolamine MMA** (N-methyl ethanolamine: $CH_3-NH-C_2H_4OH$) |

When fabrics are marked with the ink, the mark disappears naturally after from five to ten days, depending upon the fabric.

EXAMPLE 2

An ink for marking is manufactured according to the following procedure:

| | |
|---|---|
| 2 % by weight | Sodium carbonate decahydrate |
| 1 % by weight | Borax decahydrate |
| 20 % by weight | Ethyl alcohol |
| 12 % by weight | Butyl alcohol |
| 50 % by weight | Water |
| 3 % by weight | Thymolphthalein |
| 2 % by weight | Hicoat - R* |
| 6 % by weight | Ethanolamine EA**(N-(β-aminoethyl)ethanolamine: $H_2N-C_2H_4-NH-C_2H_4OH$) |
| 4 % by weight | Ethanolamine 2A** $\begin{pmatrix} C_2H_5 \\ \phantom{C_2H_5}\diagdown \\ \phantom{CCCC}N-C_2H_4OH \\ \phantom{C_2H_5}\diagup \\ C_2H_5 \end{pmatrix}$ |

*Product of Japan Shellac Industrial Co., Ltd. + 30% by weight dewaxed bleached shellac ethyl alcohol solution.
**Product of Nippon Nyukazai Co., Ltd.

What is claimed is:

1. A time disappearing marking ink comprising a solution including a phthalein indicator as color and from 1 to 8% by weight of sodium carbonate having water of crystallization of at least seven molecules, from 10 to 50% by weight of at least one lower alcohol having from one to four carbon atoms, about 2% by weight of a thickener comprising a shellac, and from 0.5 to 10% by weight of at least one ethanolamine selected from the group consisting of

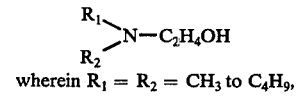

wherein $R_1 = R_2 = CH_3$ to $C_4H_9$,

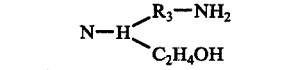

where $R_3 = CH_3$ to $C_4H_9$, and

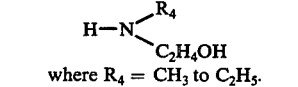

where $R_4 = CH_3$ to $C_2H_5$.

2. A composition in accordance with claim 1, wherein said lower alcohol is selected from the group consisting of ethyl alcohol, butyl alcohol and mixtures thereof.

3. A composition in accordance with claim 1, further including borax in an amount sufficient to cause disappearance of any yellow trace which would otherwise remain on the fabric after the disappearance of the phthalein color.

4. A composition in accordance with claim 1, further including about 1% borax.
5. A composition in accordance with claim 1 wherein said ethanolamine is selected from the group consisting of
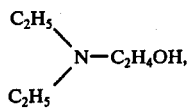
-continued
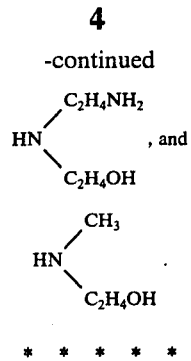
* * * * *